US009818299B1

(12) United States Patent
Jammoussi et al.

(10) Patent No.: US 9,818,299 B1
(45) Date of Patent: Nov. 14, 2017

(54) VEHICLE-TO-VEHICLE INTERSECTION NAVIGATION CONTROL

(71) Applicant: Ford Global Technologies, LLC, Dearborn, MI (US)

(72) Inventors: Hassene Jammoussi, Canton, MI (US); Pankaj Kumar, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/294,825

(22) Filed: Oct. 17, 2016

(51) Int. Cl.
*G08G 1/00* (2006.01)
*G08G 1/0967* (2006.01)
*G08G 1/0965* (2006.01)
*G08G 1/0968* (2006.01)
*G08G 1/16* (2006.01)
*G08G 1/0962* (2006.01)

(52) U.S. Cl.
CPC ..... *G08G 1/096725* (2013.01); *G08G 1/0965* (2013.01); *G08G 1/09626* (2013.01); *G08G 1/096791* (2013.01); *G08G 1/096877* (2013.01); *G08G 1/161* (2013.01); *G08G 1/163* (2013.01)

(58) Field of Classification Search
CPC ......... G08G 1/096725; G08G 1/09626; G08G 1/096791; G08G 1/161; G08G 1/163
USPC ....................................................... 340/902
See application file for complete search history.

(56) References Cited

U.S. PATENT DOCUMENTS

| 7,969,324 B2* | 6/2011 | Chevion ............... G08G 1/164 340/901 |
| 8,587,418 B2* | 11/2013 | Mochizuki ............. G08G 1/161 340/435 |
| 8,639,437 B2* | 1/2014 | Caminiti ............... G08G 1/163 180/275 |
| 8,718,906 B2* | 5/2014 | Miller ............... G08G 1/09626 340/907 |
| 9,020,660 B2 | 4/2015 | Mudalige et al. |
| 9,218,739 B2* | 12/2015 | Trombley .......... G08G 1/09626 |
| 2013/0018572 A1 | 1/2013 | Jang |
| 2014/0278029 A1 | 9/2014 | Tonguz et al. |

FOREIGN PATENT DOCUMENTS

| JP | 2006350568 A | 12/2006 |
| JP | 2007299193 A | 11/2007 |
| JP | 201456483 A | 3/2014 |

* cited by examiner

*Primary Examiner* — John A Tweel, Jr.
(74) *Attorney, Agent, or Firm* — Frank A. MacKenzie; Bejin Bieneman PLC

(57) ABSTRACT

A host vehicle computer is programmed to receive intersection arrival data via vehicle-to-vehicle communications from one or more secondary vehicles. The computer assigns priority to each of the secondary vehicles based on the intersection arrival data and identifies one of the secondary vehicles as an immediately preceding vehicle. Upon receiving a ready signal clearance from the immediately preceding vehicle, the computer actuates a powertrain of the host vehicle, causing the host vehicle to proceed into, and through, the intersection.

20 Claims, 5 Drawing Sheets

VEHICLE-TO-VEHICLE INTERSECTION NAVIGATION CONTROL

BACKGROUND

Autonomous vehicles can have technical challenges to navigating intersections. Autonomous vehicle sensors may provide inaccurate data, and/or it may be difficult to interpret sensor data to predict the behavior of other vehicles in an intersection. A centralized controller, e.g., installed proximate an intersection to provide instructions to vehicles to navigate through the intersection can be expensive and difficult to implement.

DETAILED DESCRIPTION

Introduction

Figure 1:
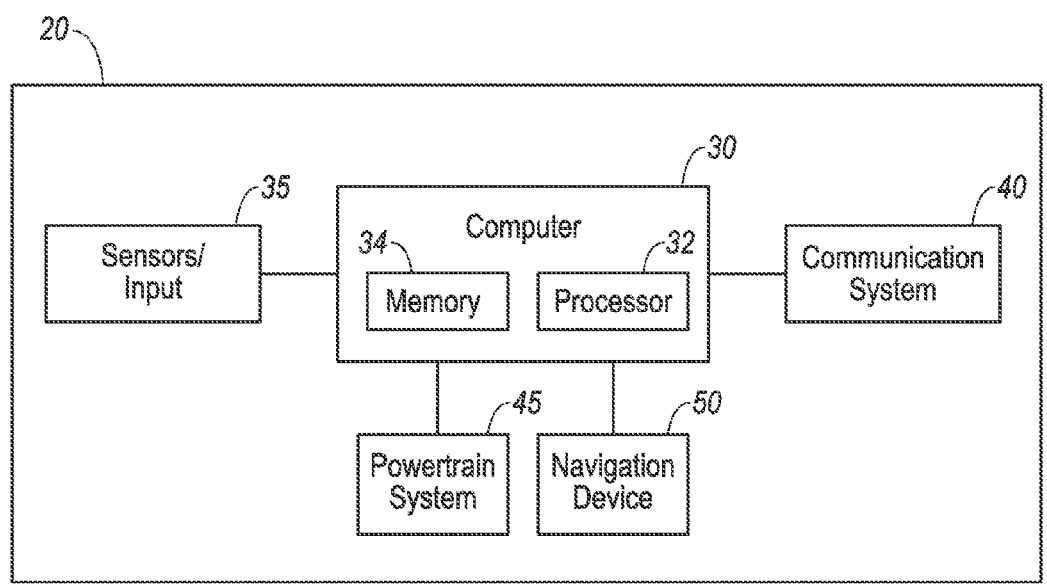
FIG. 1 is a block diagram of components of an example host vehicle and example secondary vehicles.

A vehicle-to-vehicle communication system 20 (see FIGS. 1 and 2) provides a hardware and software infrastructure to address the problems that arise from a lack of a centralized controller to control vehicles at many intersections. The system 20 thus provides a solution for determining priority of right of way for vehicles intending to proceed through an intersection without a centralized controller. The system 20 further provides increased efficiency in navigating multiple autonomous vehicles though an intersection. Accordingly, a vehicle computer 30 in a host vehicle 60 is programmed to receive intersection arrival data via vehicle-to-vehicle communications from one or more secondary vehicles 65. In certain applications, the arrival data includes a unique vehicle identification and an arrival time for each secondary vehicle.

The computer 30 assigns priority to each of the secondary vehicles based on the intersection arrival data. Based on the assigned priority, the computer 30 identifies one of the secondary vehicles as an immediately preceding vehicle. Upon receiving a ready signal clearance from the immediately preceding vehicle, the computer 30 actuates a powertrain of the host vehicle, causing the host vehicle to proceed into, and through, the intersection.

The process using vehicle-to-vehicle communications may include the host vehicle 60 determining its arrival time at the intersection, and requesting arrival data from secondary vehicles 65 at the intersection. The host vehicle 60 receives the arrival data, and determines a priority order list. Based on the priority list, the host vehicle 60 identifies an immediately preceding secondary vehicle 65. The host vehicle 60 waits at the intersection until receiving a ready signal clearance from the immediately preceding secondary vehicle 65.

While the host vehicle 60 is waiting to proceed into the intersection, it may receive an arrival data request, and send its arrival data in response.

When the host vehicle 60 determines it has received the ready signal clearance from the immediately preceding secondary vehicle 65, the host vehicle 60 actuates a powertrain to proceed through the intersection. When the host vehicle 60 determines it has cleared the intersection, it sends a ready signal clearance for any secondary vehicles 65 waiting to proceed after the host vehicle 60.

System

Figure 2:
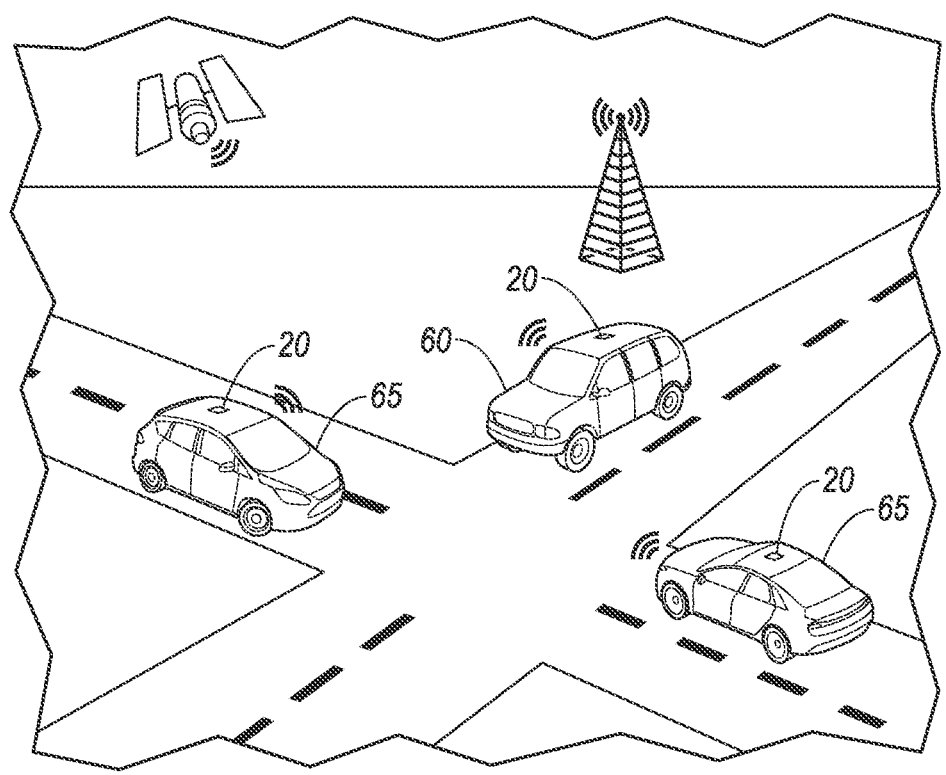
FIG. 2 is an illustration of a perspective view of an example host vehicle and example secondary vehicles at an intersection.

As shown in FIGS. 1 and 2, a vehicle-to-vehicle communication and control system 20 for determining vehicle priority at an intersection includes a computer 30 in communication with one or more sensors 35, a communication system 40, a powertrain system 45, and a navigation device 50. The vehicle system 20 may be installed in a host vehicle 60, and one or more secondary vehicles 65.

The computer 30 is a computing device that includes a processor 32 and a memory 34.

The processor 32 is implemented via circuits, chips, or other electronic components and may include one or more microcontrollers, one or more field programmable gate arrays (FPGAs), one or more application specific circuits (ASICs), one or more digital signal processors (DSPs), one or more customer integrated circuits, etc. The processor 32 is programmable to process the data and communications received via the memory 34, the sensors 35, the communication system 40 and the navigation device 50. Processing the data may include processing communications and/or other data captured or provided by the sensors 35, the communication system 40, and the navigation device 50 to determine when has priority cleared for the host vehicle 60 relative to one or more secondary vehicles 65. The processor 32 may be further programmable to cause the host vehicle 60 to proceed through an intersection. As described below, the processor 32 instructs vehicle components to actuate in accordance with the sensor data.

The memory 34 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 34 may store instruction for performing the processes described herein, and may data collected from sensors and communications.

The computer 30 is in electronic communication with one or more input devices, e.g. such as are conventional and known (and therefore not shown in the drawings), for providing data to the computer 30 and one or more output devices for receiving data and/or instructions from the computer 30 e.g., to actuate an output device. Exemplary input devices include: human machine interfaces (HMIs) such as a switch or graphical user interface (GUI); imaging devices such as LiDAR, still and/or video cameras, infrared sensors, the navigation device 50 etc., as well as other sensors and/or electronic control units (ECUs) that are known to provide data, e.g., on a vehicle communications bus or network, such as, radar, ultrasonic sensors, accelerometers, gyroscopes, pressure sensors, thermometers, barometers. altimeters, current sensing devices, voltage sensing devices, microphones, light sensors, etc. etc. Exemplary output that may be actuated by the computer devices include: warning light and audible subsystems; GUIs; HMIs; communication systems 40 having Bluetooth, Wi-Fi or cellular capabilities; other computers; the powertrain system 45, etc.

The sensors 35 collect and send data to the computer 30. The sensors 35 may detect internal states of the vehicle, for example, wheel speed, wheel orientation, and engine and transmission variables. The sensors 35 may detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 35 may detect the external world, for example, radar sensors, scanning laser range finders, light detection and ranging (LIDAR) devices, and image processing sensors such as cameras.

The communication system 40 is in communication with the computer 30. The communication system 40 transmits and receives information wirelessly from other communication systems, enabling signals, data and other information to be exchanged via vehicle-to-vehicle communications between the host vehicle 60 and the one or more secondary vehicles 65. Exemplary communication systems 40 include known Wi-Fi systems, radio transmitters and receivers, telecommunications systems, Bluetooth systems, cellular systems and mobile satellite communication systems.

The powertrain system 45 is in communication with the computer 30. Upon actuation by the computer 30, the powertrain system 45 provides a torque to wheels of the vehicle, propelling the vehicle forward. The powertrain system 45 may include an internal-combustion engine, a transmission, and/or an electric motor and a battery pack. The battery pack is connected to the electric motor. In a conventional powertrain, the engine is rotationally coupled to the transmission. In a hybrid powertrain, the electric motor is coupled to the transmission and transmits rotational kinetic energy to the transmission, and the internal-combustion engine may be coupled to either the electric motor or to the transmission. The transmission transmits the kinetic energy from the electric motor and/or the internal-combustion engine to a drive axle and ultimately to wheels of the vehicle, while applying a gear ratio allowing different tradeoffs between torque and rotational speed.

The navigation device 50 is in communication with the computer 30. The navigation device 50 determines a location of the vehicle relative to stored map data. To determine the location, the navigation device 50 may rely on information from a global navigation satellite system, distance data from sensors 35 attached to a drivetrain of the vehicle, a gyroscope and/or an accelerometer. Exemplary navigation devices 50 include known GPS navigation devices, personal navigation devices, and automotive navigation systems.

Process

Figure 3:
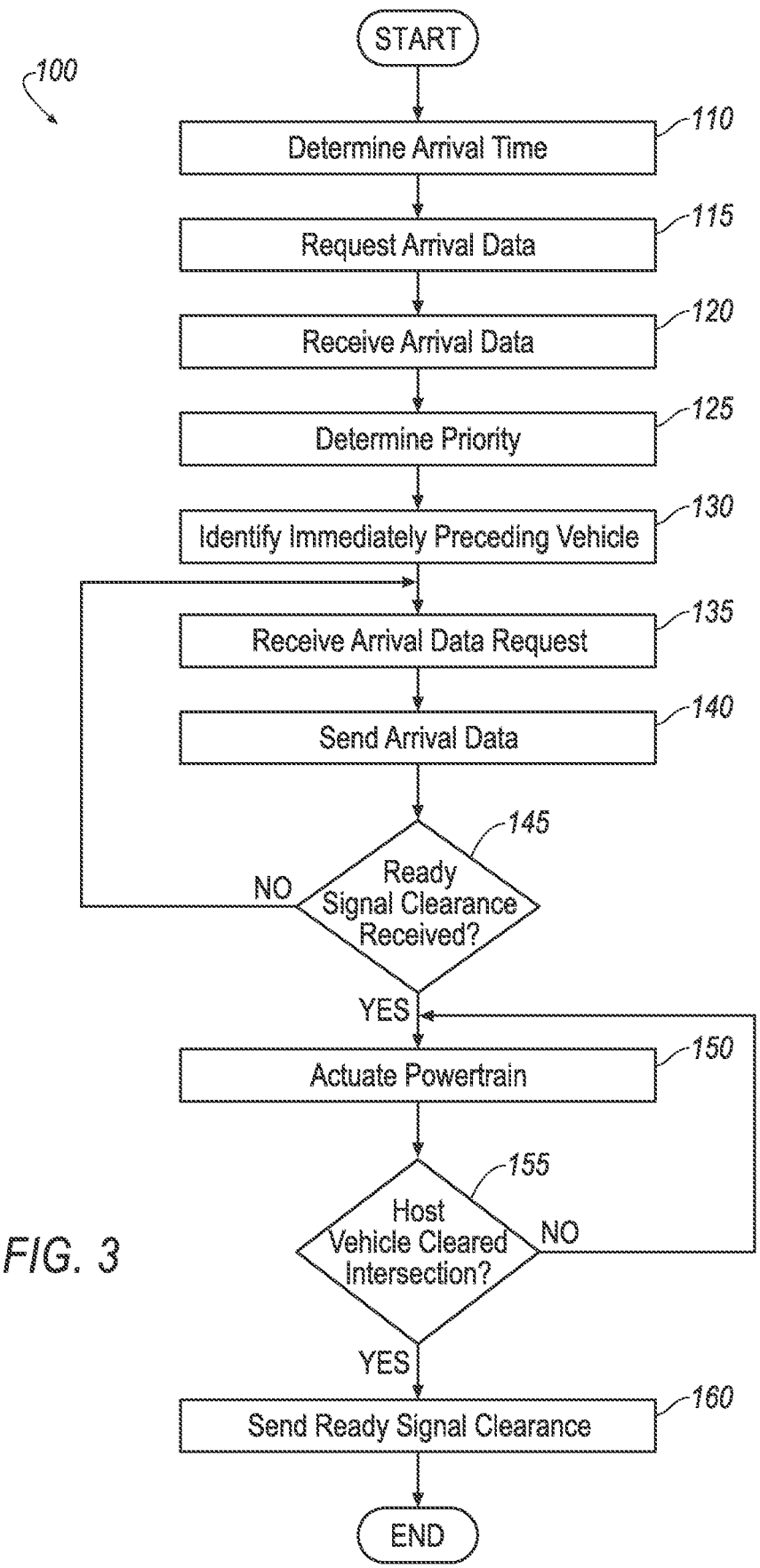
FIG. 3 illustrates a flow chart of an example process for determining priority at an intersection.

With reference to FIG. 3, a process 100 for determining vehicle priority at an intersection begins when the host vehicle 60 approaches an intersection. For example, the computer 30 may determine that the host vehicle 60 is approaching an intersection based on information and data received from the navigation device 50.

Beginning the process at a block 110, the computer 30 determines the arrival time of the host vehicle 60. For example, the arrival time may be determined using the communication system 40 to access a network having a clock, e.g., an atomic clock, as is known, whereupon the network can indicate a time that the host vehicle arrived. Additionally, the network can further be used to synchronize vehicle 60 computer 30 clocks. Further alternatively and/or additionally network can indicate a current time to the computer 30 prior to the host vehicle 60 arriving at the intersection, the computer 30 maintaining the current time, and the arrival time indicated from the current time maintained by the computer 30. The arrival time may be when the host vehicle 60 initially stops in a queue waiting to proceed through the intersection, such as the location of vehicle 61 in FIG. 4. Alternatively, the arrival time may be when the host vehicle 60 stops at a first position at an intersection. As used herein, the first position is the position in the queue at which no other vehicles are queued directly in front of the vehicle, such as vehicle 62 in FIG. 4.

In the first position the host vehicle 60, and/or the secondary vehicle(s) 65, may send a ready signal to the other vehicles 60, 65 at the intersection. The ready signal indicates a ready status that the sending vehicle 60, 65 is ready to proceed through the intersection, and is waiting until a vehicle having immediate priority has cleared its ready signal. The ready signal may be broadcast addressed to all vehicles. The ready signal may be broadcast to a specific vehicle in response to a request received from another vehicle, as discussed further below. The ready signal may be a discrete broadcast. The ready signal may be broadcast continuously, or sent at predetermined time intervals, i.e. every 5 seconds. The ready signal may include the arrival time of the broadcasting vehicle.

The determination of the arrival time may be based on a locational, or distance, comparison of the host vehicle 60 with the intersection, and further based on the host vehicle's 60 location relative to other vehicles at the intersection. For example, the computer 30 may determine that the host vehicle 60 is in a queue waiting to proceed through an intersection by determining the host vehicle 60 is stopped within a predetermined distance of the intersection, i.e. 100 ft., based on information and data received from the navigation device 50. The computer may further determine the host vehicle 60 is in a queue waiting to proceed through an intersection by determining that another vehicle is detected with a predetermined distance, i.e. 20 ft., in front of the host vehicle 60. In another example, the computer 30 may determine that the host vehicle 60 is in the first position by determining that the host vehicle 60 is stopped within a predetermined distance of the intersection, i.e. 50 ft., and may further determine that no other vehicle is detected with a predetermined distance, i.e. 20 ft., in front of the host vehicle 60, based on information received from the navigation device 50 and the one or more sensors 35, such as proximity sensors, LiDAR, etc.

Continuing the process at a block 115, the computer 30 requests intersection arrival data via vehicle-to-vehicle communications from the one or more secondary vehicles 65. For example, the computer 30 may transmit the request for intersection arrival data with the communication system 40 to be received by communication systems of the one or more secondary vehicles 65.

The request for intersection arrival data may include a request for a unique identification and an arrival time for each of the one or more secondary vehicles 65. The unique identification of each secondary vehicle 65 may be a vehicle identification number (YIN) associated with the vehicle at the time of manufacture, a username associated with a user of the vehicle, an electronic pin generated by a computer of the vehicle, etc. The arrival time for the secondary vehicle 65 may be determined similar to that of the host vehicle 60 discussed above. The request may further include the ready signal.

In response to receiving the request for intersection arrival data, the one or more secondary vehicles 65 may transmit intersection arrival data, including the unique identification and the arrival time for each of the one or more secondary vehicles 65. The response may further include the ready signal.

Next, at a block 120, the computer 30 of the host vehicle 60 receives the intersection arrival data via vehicle-to-vehicle communications from the one or more secondary vehicles 65, such as being received by the communication system 40 of the host vehicle 60 after being sent from the communication systems 40 of the one or more secondary vehicles 65.

Next, at a block 125. the computer 30 determines a priority order list for the one or more secondary vehicles 65 based on the received arrival data. The priority order is assigned by the computer 30 comparing the respective arrival data of the one or more secondary vehicles 65, and generating a chronological list of the one or more secondary vehicles 65. The list of the one or more secondary vehicles 65 is ordered such that the secondary vehicle 65 that arrived at the intersection first is at a top of the list, and proceeds sequentially, with the secondary vehicle 65 that arrived last at the bottom of the list. For example, the arrival time of each of the one or more secondary vehicles 65 may be used to create a list with the one or more secondary vehicles 65 in chronological order. The priority order may include arrival data for the host vehicle 60.

In response, at a block 130, the computer 30 identifies, based on the determined priority list, one of the one or more secondary vehicles 65 as an immediately preceding vehicle. The immediately preceding vehicle is the last vehicle of the one or more secondary vehicles 65 to have priority to proceed through the intersection before the host vehicle 60 proceeds. For example, the immediately preceding vehicle may be identified at the bottom of the list as being the secondary vehicle that arrived last. In another example, the immediately preceding vehicle may be identified as the secondary vehicle having an arrival time that most closely precedes the arrival time of the host vehicle 60 determined by the computer 30.

At a block 135, while the host vehicle 60 computer 30 is waiting to instruct the vehicle 60 to proceed through the intersection, the host vehicle 60 may receive an arrival data request through the communication system 40 from one or more secondary vehicles 65 via vehicle-to-vehicle communications, as described above.

Next, at a block 140, the computer 30 sends arrival data, including the arrival time of the host vehicle 60, via vehicle-to-vehicle communications, as described above.

At a block 145, the computer 30 determines whether a ready signal clearance has been received from the secondary vehicle identified as the immediately preceding vehicle. The ready signal clearance informs receiving vehicles that the sending vehicle has cleared its ready status, such as when the sending vehicle has proceeded through the intersection. The ready signal clearance may be an explicit signal sent by the secondary vehicle to the host vehicle 60 via vehicle-to-vehicle communications. Alternatively, the ready signal clearance may be an omission of a transmitted signal, e.g., cessation of a signal broadcast continually, or intermittently, such as at predetermined time intervals, by the secondary vehicle to the host vehicle 60 via vehicle-to-vehicle communications. The ready signal clearance may include data indicating that the sending vehicle has cleared its ready status, the identity of the sending vehicle, the priority order of the sending vehicle, and the direction of travel of the sending vehicle. The ready signal clearance may be addressed to an immediately succeeding vehicle. The immediately succeeding vehicle may be identified as the vehicle having an arrival time that most closely succeeds the arrival time of the vehicle sending the ready signal clearance. The ready signal clearance may be a public broadcast received by all vehicles within range.

At the block 150, in response to the computer 30 receiving the ready signal clearance from the immediately preceding vehicle, the computer 30 actuates the powertrain system 45 causing the host vehicle 60 to proceed into the intersection.

At a block 155, after the powertrain 45 has been actuated, the computer 30 determines whether the host vehicle 60 has cleared the intersection. Determination of the whether the host vehicle 60 has cleared the intersection may be based on a comparison of the host vehicle's 60 geo-location compared to the intersection, and/or further based on the distance traveled subsequent actuating the powertrain system 45 at the block 150. For example, the host vehicle's position may be determined by the navigation device 50 relative to the map data. In further example the navigation device 50 may compare the host vehicle's current position to the first position location to determine the distance traveled subsequent actuating the powertrain system 45; this distance may also be determined with data received from the sensors 35, such as using known speed sensors and known algorithms to calculate distance based on a measured speed for a period of time. Once the host vehicle 60 has traveled at least a predetermined distance amount, e.g. 100 ft., the computer 30 may determine the host vehicle 60 has cleared the intersection. When the computer determines the host vehicle 60 has cleared the intersection, the computer 30 moves to a block 160. Else, the computer 30 returns to the block 150, continuing to actuate the powertrain system 45 and determining whether the host vehicle 60 has cleared the intersection in a looped manner.

At the block 160, after the computer 30 has determined that the host vehicle 60 has cleared the intersection, the computer 30 sends a ready signal clearance. The ready signal clearance indicates to vehicles at the intersection that the host vehicle has proceeded through the intersection, and other vehicles waiting to go through the intersection may proceed. As discussed above, the ready signal clearance may be an explicit signal send by the communication system 40 to be received by other vehicles through vehicle-to-vehicle communication. Additionally, also as discussed above, the ready signal clearance may an omission of a transmitted signal e.g. the cessation of a signal broadcast continually, or intermittently, such as at predetermined time intervals.

With reference now to FIGS. 4-7, the host vehicle 60, and secondary vehicles 65 are shown navigating an intersection.

Figure 4:
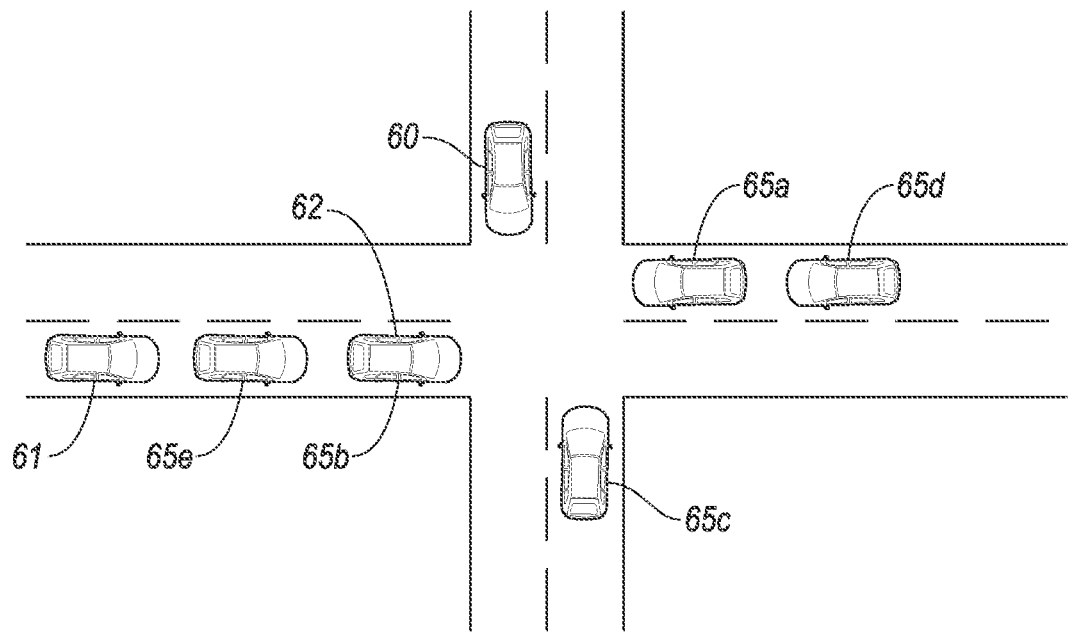
FIG. 4 is an illustration of a plan view of a host vehicle and secondary vehicles performing the process of FIG. 3.

In FIG. 4, the host vehicle 60 has arrived at the intersection at the first position. The host vehicle 60 determines its arrival time (FIG. 3, block 110). The host vehicle 60 then sends out a request for arrival data (FIG. 3, block 115). The secondary vehicles 65a-c in the first positions around the intersection each send arrival data to the host vehicle 60. The host vehicle 60 receives the arrival data and determines priority of the secondary vehicles 65a-c based on arrival times (FIG. 3, blocks 120 and 125), as shown in the table below.

| Vehicle | Arrival Time |
| --- | --- |
| Secondary Vehicle 65a | 14:16.23 |
| Secondary Vehicle 65b | 14:16.26 |
| Host Vehicle 60 | 14:16.33 |
| Secondary Vehicle 65c | 14:16.34 |

Based on the determined priority, the host vehicle 60 identifies secondary vehicle 65b as being the immediately preceding vehicle (FIG. 3, block 130).

Figure 5:
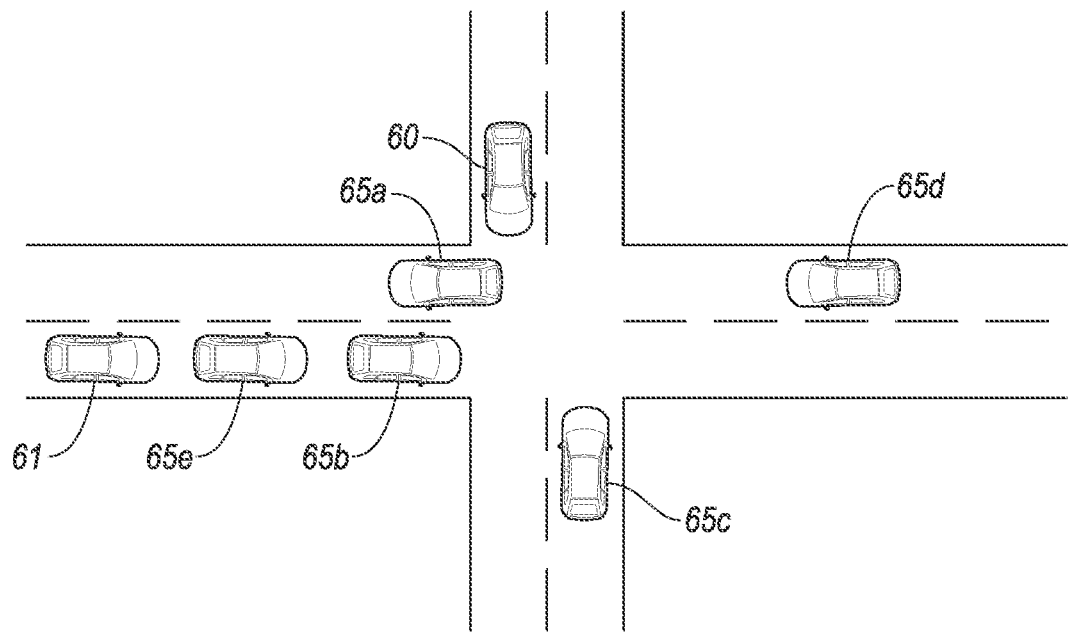
FIG. 5 is an illustration of a plan view of the host vehicle and secondary vehicles of FIG. 4 continuing to perform the process of FIG. 3.

In FIG. 5, secondary vehicle 65a proceeds through the intersection, and sends the ready signal clearance. Host vehicle 60 may receive the ready signal clearance from secondary vehicle 65a, however, secondary vehicle 65a is not the immediate preceding vehicle to the host vehicle 60. Accordingly, the host vehicle 60 continues to wait at the intersection.

Figure 6:
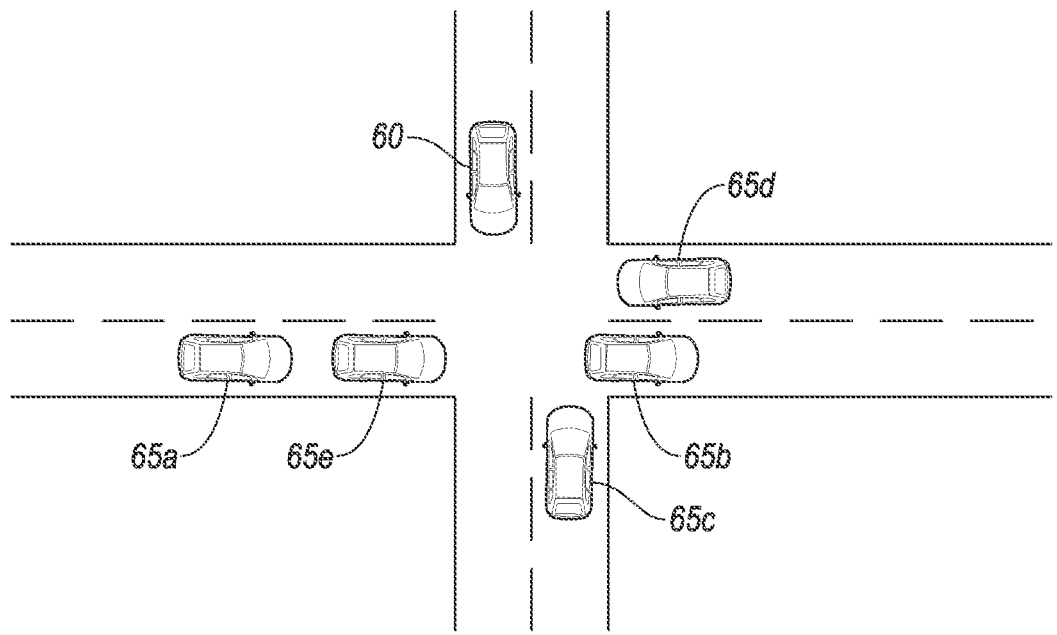
FIG. 6 is an illustration of a plan view of the host vehicle and secondary vehicles of FIG. 4 continuing to perform the process of FIG. 3.

In FIG. 6, while host vehicle 60 is waiting to proceed through the intersection, secondary vehicle 65d determines that secondary vehicle 65a is no longer within a predetermined distance in front of secondary vehicle 65d, and advances to the first position at the intersection. In the first position, secondary vehicle 65d determines its arrival time, then sends out a request for arrival data. Host vehicle 60 receives the arrival data request (FIG. 3, block 135), and then responds by sending its arrival data (FIG. 3, block 140).

Also in FIG. 6, secondary vehicle 65b receives the ready signal clearance from secondary vehicle 65a, the immediately preceding vehicle to secondary vehicle 65b. Having received the ready signal clearance, secondary vehicle 65b precedes through the intersection and sends its ready signal clearance. The ready signal clearance is received by host vehicle 60 (FIG. 3, block 145). Secondary vehicle 65e advances to the first position vacated by secondary vehicle 65b.

Figure 7:
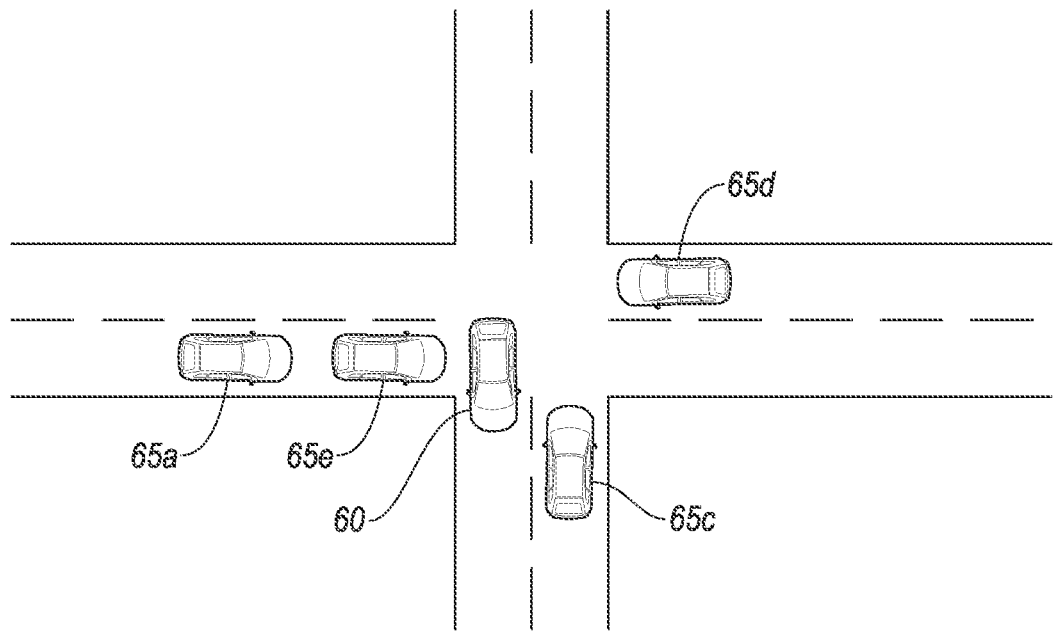
FIG. 7 is an illustration of a plan view of the host vehicle and secondary vehicles of FIG. 4 continuing to perform the process of FIG. 3.

In FIG. 7, having received the ready signal clearance from secondary vehicle 65b, the immediately preceding vehicle to host vehicle 60, host vehicle 60 actuates its powertrain (FIG. 3, block 150) to proceed through the intersection. Once host vehicle 60 has cleared the intersection (FIG. 3, block 155), it sends the ready signal clearance (FIG. 3, block 160). The ready signal clearance is received by the secondary vehicle 65c, and the process is continued by secondary vehicles 65c-e etc.

CONCLUSION

Computing devices generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 100, one or more of the steps could be omitted, or the steps could be executed in a different order. In other words, the descriptions of systems and/or processes herein are provided for the purpose of illustrating certain embodiments, and should in no way be construed so as to limit the disclosed subject matter, unless such order is explicitly described in the claims.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A computer comprising programming for:
   determining a host vehicle arrival time at an intersection;
   receiving intersection arrival data via vehicle-to-vehicle communications from one or more secondary vehicles;
   based on the intersection arrival data, determining a priority list for the one or more secondary vehicles;
   based on the priority list, identifying one of the secondary vehicles as an immediately preceding vehicle; and
   upon receiving a ready signal clearance from the immediately preceding vehicle, actuating a powertrain system of the host vehicle.

2. The computer of claim 1, wherein the programming further comprises:
   receiving intersection arrival data directly from the one or more secondary vehicles, the intersection arrival data including a unique vehicle identification and an arrival time for each of the one or more secondary vehicles.

3. The computer of claim 1, wherein the programming further comprises:
sending an intersection arrival data request before receiving the intersection arrival data.

4. The computer of claim 1, wherein the arrival time is when the host vehicle initially stops in a queue waiting to proceed through the intersection.

5. The computer of claim 1, wherein the arrival time is when the host vehicle stops at a first position of the intersection.

6. The computer of claim 1, wherein the arrival time is when the host vehicle stops within a predetermined distance from the intersection.

7. The computer of claim 1, wherein the arrival time is when the host vehicle stops within a predetermined distance of the intersection with no vehicle detected within a predetermined distance in front of the host vehicle.

8. The computer of claim 1, wherein the programming further comprises:
determining when the host vehicle has cleared the intersection; and
sending a ready signal clearance after the host vehicle has cleared the intersection.

9. The computer of claim 1, wherein the programming further comprises:
sending a ready signal clearance when the host vehicle has traveled a predetermined distance after actuating the powertrain system.

10. The computer of claim 1, wherein the programming further comprises:
receiving an intersection arrival data request; and
sending intersection arrival data in response to receiving the intersection arrival data request.

11. A method comprising:
determining a host vehicle arrival time at an intersection;
receiving intersection arrival data via vehicle-to-vehicle communications from one or more secondary vehicles;
based on the intersection arrival data, determining a priority list for the one or more secondary vehicles;
based on the priority, identifying one of the secondary vehicles as an immediately preceding vehicle;
upon receiving a ready signal clearance from the immediately preceding vehicle, actuating a powertrain system of the host vehicle.

12. The method of claim 11, further comprising:
sending an intersection arrival data request before receiving the intersection arrival data.

13. The method of claim 11, wherein the arrival time is when the host vehicle initially stops in a queue waiting to proceed through the intersection.

14. The method of claim 11, wherein the arrival time is when the host vehicle stops at a first position of the intersection.

15. The method of claim 11, wherein the arrival time is when the host vehicle stops within a predetermined distance from the intersection.

16. The method of claim 11, Wherein the arrival time is when the host vehicle stops within a predetermined distance of the intersection with no vehicle detected within a predetermined distance in front of the host vehicle.

17. The method of claim 11, further comprising:
determining when the host vehicle has cleared the intersection; and
sending a ready signal clearance after the host vehicle has cleared the intersection.

18. The method of claim 11, further comprising:
sending a ready signal clearance when the host vehicle has traveled a predetermined distance after actuating the powertrain system.

19. A system comprising:
a powertrain system;
a navigation device; and
a controller in communication with the powertrain system and the navigation system, the controller comprising a processor and a memory, the memory storing instructions executable by the processor, the instructions including instructions for:
determining an arrival time of a host vehicle at an intersection;
receiving intersection arrival data via vehicle-to-vehicle communications from one or more secondary vehicles;
based on the intersection arrival data, determining a priority list for the one or more secondary vehicles;
based on the priority list, identifying one of the secondary vehicles as an immediately preceding vehicle; and
upon receiving a ready signal clearance from the immediately preceding vehicle, actuating a powertrain of the host vehicle.

20. The system of claim 19, wherein the instructions further including instructions for:
sending an intersection arrival data request before receiving the intersection arrival data;
receiving an intersection arrival data request;
sending intersection arrival data in response to receiving the intersection arrival data request;
determining when the host vehicle has cleared the intersection; and
sending a ready signal clearance after the host vehicle has cleared the intersection.

* * * * *